United States Patent [19]
Yoon et al.

(10) Patent No.: US 11,281,015 B2
(45) Date of Patent: Mar. 22, 2022

(54) ELECTRONIC DEVICE

(71) Applicant: LG ELECTRONICS INC., Seoul (KR)

(72) Inventors: Sumin Yoon, Seoul (KR); Mundeock Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 373 days.

(21) Appl. No.: 16/488,868

(22) PCT Filed: Aug. 12, 2019

(86) PCT No.: PCT/KR2019/010142
§ 371 (c)(1),
(2) Date: Aug. 26, 2019

(87) PCT Pub. No.: WO2021/029448
PCT Pub. Date: Feb. 18, 2021

(65) Prior Publication Data
US 2021/0405381 A1 Dec. 30, 2021

(51) Int. Cl.
G02B 27/01 (2006.01)
(52) U.S. Cl.
CPC ..... *G02B 27/0176* (2013.01); *G02B 27/0179* (2013.01); *G02B 2027/0159* (2013.01);
(Continued)
(58) Field of Classification Search
CPC .. G02B 27/01; G02B 27/017; G02B 27/0176; G02B 27/0179; G02B 2027/0159; G02B 2027/0178; G02B 2027/0187
(Continued)

(56) References Cited

U.S. PATENT DOCUMENTS

2004/0008157 A1* 1/2004 Brubaker ............. G02B 27/017
345/8
2006/0109420 A1 5/2006 Holm
(Continued)

FOREIGN PATENT DOCUMENTS

KR 1020180122496 11/2018
KR 1020190015173 2/2019
KR 1020190018518 2/2019

OTHER PUBLICATIONS

PCT International Application No. PCT/KR2019/010142, International Search Report dated May 12, 2020, 3 pages.

*Primary Examiner* — William R Alexander
(74) *Attorney, Agent, or Firm* — Lee, Hong, Degerman, Kang & Waimey PC

(57) ABSTRACT

An electronic device is disclosed. The electronic device includes a support unit, a display unit, and a slide unit coupling the support unit and the display unit to be relatively movable with respect to each other, wherein the slide unit includes a base and a slide member which relatively moves forward and backward, wherein the base includes a first outer guide portion and a first inner guide portion and the slide member includes a second outer guide portion and a second inner guide portion, having a dual guide structure. An electronic device according to the present invention may be associated with an artificial intelligence module, robot, augmented reality (AR) device, virtual reality (VR) device, and device related to 5G services.

19 Claims, 13 Drawing Sheets

(52) U.S. Cl.
CPC ............... *G02B 2027/0178* (2013.01); *G02B 2027/0187* (2013.01)

(58) Field of Classification Search
USPC .......................................... 359/630
See application file for complete search history.

(56) References Cited

U.S. PATENT DOCUMENTS

| | | | |
|---|---|---|---|
| 2012/0038543 A1* | 2/2012 | Martin | G02B 27/0176 345/8 |
| 2014/0016942 A1* | 1/2014 | Masarik | G02B 27/017 398/130 |
| 2016/0173743 A1* | 6/2016 | Masarik | H04N 5/772 348/158 |
| 2019/0056798 A1* | 2/2019 | Toriihara | G06F 3/038 |
| 2019/0159354 A1 | 5/2019 | Zheng et al. | |

* cited by examiner

ELECTRONIC DEVICE

CROSS-REFERENCE TO RELATED APPLICATIONS

This application is the National Stage filing under 35 U.S.C. 371 of International Application No. PCT/KR2019/010142, filed on Aug. 12, 2019, the contents of which are hereby incorporated by reference herein in its entirety.

BACKGROUND OF THE INVENTION

Field of the Invention

The present invention relates to an electronic device and, more particularly, to an electronic device used for Virtual Reality (VR), Augmented Reality (AR), and Mixed Reality (MR).

Related Art

Virtual reality (VR) refers to a special environment or situation generated by man-made technology using computer and other devices, which is similar but not exactly equal to the real world.

Augmented reality (AR) refers to the technology that makes a virtual object or information interwoven with the real world, making the virtual object or information perceived as if exists in reality.

Mixed reality (MR) or hybrid reality refers to combining of the real world with virtual objects or information, generating a new environment or new information. In particular, mixed reality refers to the experience that physical and virtual objects interact with each other in real time.

The virtual environment or situation in a sense of mixed reality stimulates the five senses of a user, allows the user to have a spatio-temporal experience similar to the one perceived from the real world, and thereby allows the user to freely cross the boundary between reality and imagination. Also, the user may not only get immersed in such an environment but also interact with objects implemented in the environment by manipulating or giving a command to the objects through an actual device.

Recently, research into the gear specialized in the technical field above is being actively conducted.

SUMMARY OF THE INVENTION

The present invention provides an electronic device capable of solving a structural problem that may arise when a connection portion is operated to adjust a distance between a display unit and eyes when the electronic device is used for virtual reality (VR)k augmented reality (AR), and mixed reality (MR).

In an aspect, an electronic device includes: a support unit; a display unit connected to the support unit and displaying an image; and a slide unit coupling the support unit and the display unit to be relatively movable with respect to each other, wherein the slide unit includes a base coupled to one of the support unit and the display unit and a slide member coupled to the other of the support unit and the display unit and moving forward and backward in one direction relatively with respect to the base, wherein the base includes a first inner guide portion positioned on an inner side with respect to a first outer guide portion on the basis of the first outer guide portion and a central axis in a movement direction and the slide member includes a second outer guide portion movably coupled to the first outer guide portion and a second inner guide portion movably coupled to the first inner guide portion.

Here, the first outer guide portion and the first inner guide portion may be provided in pairs at both sides of positions facing each other with respect to the central axis in the movement direction of the slide member.

Further, the first outer guide portion and the second outer guide portion may be provided by coupling a first guide protrusion and a first slit extending in a movement direction of the first guide protrusion, and the first inner guide portion and the second inner guide portion may be provided by coupling a second guide protrusion and a second slit extending in a movement direction of the second guide protrusion.

Further, the slide member may include a slide plate and an inner guide member provided on one surface of the slide plate facing the base, the second outer guide portion may be provided on an outer side of a side portion edge of the slide plate parallel to the movement direction, and the second inner guide portion may be provided on an inner side of the side portion edge of the inner guide member parallel to the movement direction.

According to one aspect, the inner guide member may be coupled to one surface of the slide plate, and the second inner guide portion may protrude from one surface of the inner guide member facing the base.

According to another aspect, the inner guide member may be integrally formed on the slide plate, and the second inner guide portion may protrude from one surface of the slide plate facing the base.

The second inner guide portion may include a slide supporter extending in the movement direction and having a slit allowing a portion of the first inner guide portion to be movably inserted therein.

Further, the second inner guide portion may have a slit extending in the movement direction and opened to face the inner side, the first inner guide portion may include a guide protrusion protruding toward the outside, and the guide protrusion may be movably coupled to the slit.

In addition, the inner guide member may further include a stop member protruding from one surface facing the base, and the stop member may interfere with the protruding portion of the base to limit a movement range of the slide member.

The second inner guide portion may have a slit extending in the movement direction and opened to face the base, the first inner guide portion may include a guide protrusion protruding toward the slide member, and the guide protrusion may be movably coupled to the slit.

The first outer guide portion may include a slide supporter having a slit extending in the movement direction and allowing a portion of the second outer guide portion to be movably inserted therein.

In addition, the first outer guide portion may be formed by bending one side portion of the base to be parallel to the movement direction, and the first inner guide portion may be formed by bending a peripheral portion of an opening formed inside the base to be parallel to the movement direction.

In addition, the first outer guide portion and the second outer guide portion may be provided by coupling a guide protrusion and a slit extending in the movement direction of the guide protrusion, and the slit may be provided to allow the guide protrusion to penetrate through the first outer guide portion.

Here, the guide protrusion may have a guide support portion supporting an outer surface of the first outer guide portion at an end portion thereof.

The guide support portion may include a first support surface extending in a direction perpendicular to the movement direction and supporting an outer surface of the first outer guide portion.

The guide support portion may further include a second support surface bent along one surface of the first outer guide portion at an end portion of the first support surface.

Alternatively, the first support surface may extend toward the base, and the guide support portion may further include a third support surface bent in an outward direction parallel to the base at an end portion of the first support surface.

In addition, the support unit may be supported on the head or face part of a user, and the display unit may include a display portion positioned in front of the user's eyes and displaying an image and may be provided as a head-mounted display (HMD).

The electronic device may further include: a sensor recognizing information regarding an eyeball of the user or information regarding whether the user wears glasses; a controller controlling a distance between the display portion and the eyeball through the information from the sensor; and a slide driving unit operating the slide unit according to a signal from the controller.

The electronic device may further include: an input unit receiving information regarding whether the user wears glasses from the user and a slide driving unit operating the slide unit such that a distance between the display portion and the eyeball is a first distance if the information input to the input unit is information regarding wearing of the glasses and operating the sliding unit such that the distance between the display portion and the eyeball is a second distance shorter than the first distance.

In another aspect, an electronic device includes: a support unit; a display unit connected to the support unit and displaying an image; and a slide unit coupling the support unit and the display unit to be relatively movable with respect to each other, wherein the slide unit includes a base coupled to one of the support unit and the display unit and a slide member coupled to the other of the support unit and the display unit and moving forward and backward in one direction relatively with respect to the base, wherein the base includes: a first outer guide portion extending in a movement direction of the slide member and having a first guide portion provided toward an inner side and a first inner guide portion provided on one surface facing the slide member, positioned on an inner side with respect to the first outer guide portion on the basis of a central axis in a movement direction, extending in the movement direction, and having a second guide portion provided toward an outer side, and the slide member may include a second outer guide portion having a third guide portion movably coupled to the first guide portion and provided toward the outer side and a second inner guide portion provided on one surface facing the base, positioned on an inner side with respect to the second outer guide portion on the basis of the central axis in the movement direction, and having a fourth guide portion movably coupled to the second guide portion and provided toward the outer side.

DESCRIPTION OF EMBODIMENTS

Figure 1:
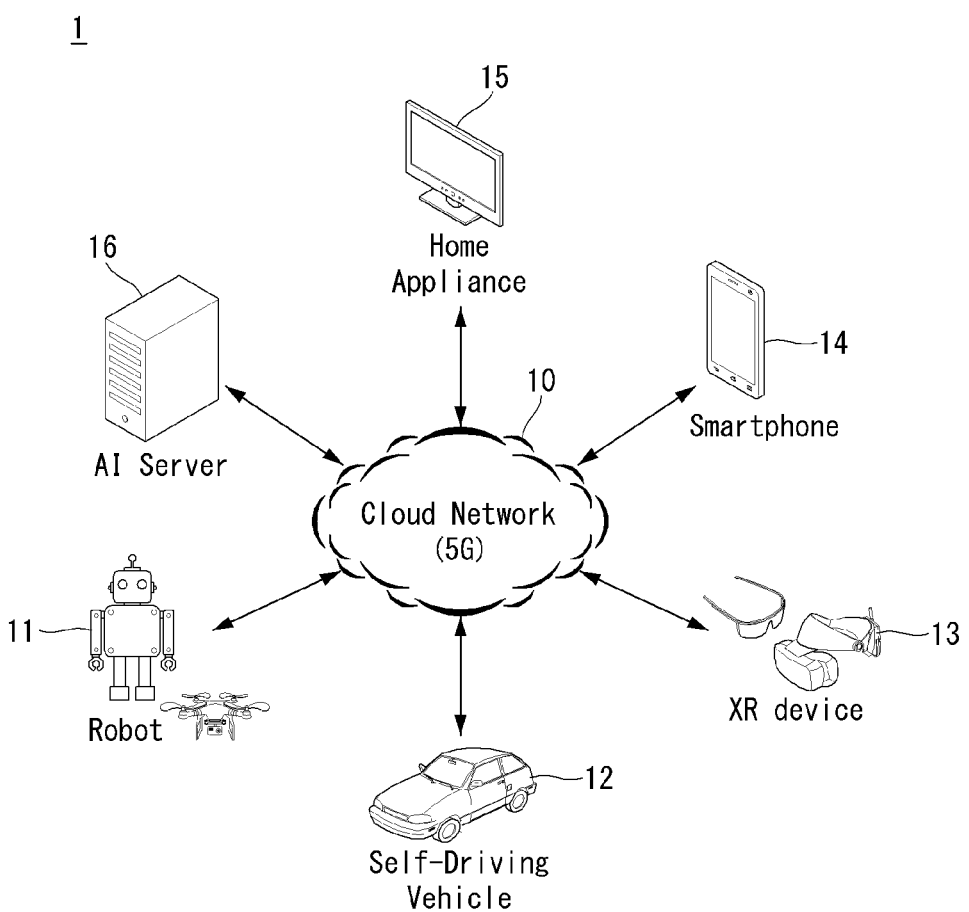
FIG. 1 is a conceptual diagram illustrating an embodiment of an AI device.

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present invention; rather, it should be understood that the appended drawings include all of the modifications, equivalents or substitutes described by the technical principles and belonging to the technical scope of the present invention.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present invention to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image.

And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

Hereinafter, an electronic device providing an extended reality according to an embodiment of the present invention will be described.

An embodiment of the electronic device will be described based on an embodiment applied to a head mounted display (HMD). However, embodiments of the electronic device according to the present invention may include mobile phones, smartphones, laptop computers, digital broadcasting terminals, personal digital assistants (PDAs), portable multimedia players (PMPs), navigation, and slate PCs, tablet PCs, ultrabooks, wearable devices, and the like. The wearable devices may include smartwatches in addition to the HMD.

Figure 2:
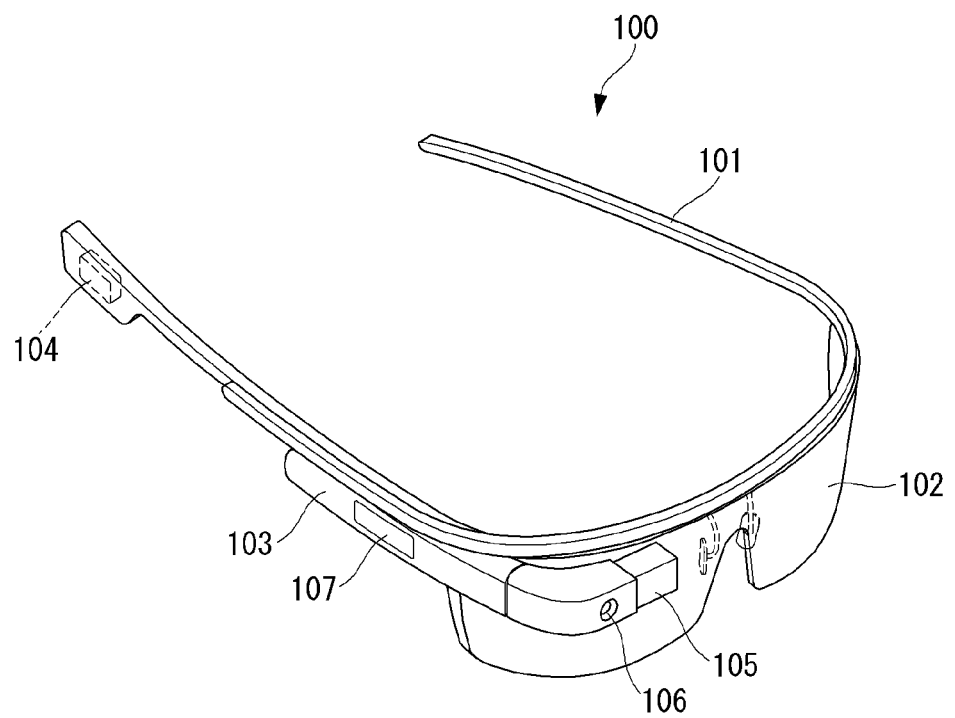
FIG. 2 is a perspective view of an augmented reality (AR) electronic device according to an embodiment of the present invention.

FIG. 2 is a perspective view of an augmented reality (AR) electronic device according to an embodiment of the present invention.

Referring to FIG. 2, the AR electronic device may be provided as a glass type. The glass type electronic device 100 may be configured to be worn on a head of a human body and may include a frame part (case, housing, etc.) 101 therefor. The frame part may be formed of a flexible material to facilitate wearing.

The frame part 101 is supported on the head and provides a space in which various components are mounted. As illustrated, electronic components such as a controller 103, an audio output unit 104, and the like may be mounted in the frame part 101. Further, a lens 102 covering at least one of a left eye and a right eye may be detachably mounted on the frame part.

The controller 103 is configured to control various electronic components provided in the electronic device 100. In the drawing, the controller 103 is illustrated to be installed in the frame part on one side of the head. However, the position of the controller 103 is not limited thereto.

The display portion 105 may be implemented as a head-mounted display (HMD) type. The HMD type is a display scheme mounted on the head part and showing an image directly in front of the user's eyes. When the user wears the glass type electronic device 100, the display portion 105 may be disposed to correspond to at least one of the left eye and the right eye to provide an image directly in front of the user's eyes. In the drawing, the display portion 105 is illustrated to be positioned at a portion corresponding to the right eye so that an image may be output toward the right eye of the user.

The display portion 105 may project an image to a display area using a prism. Further, the prism may be formed to be translucent so that the user may see the projected image together with a general field of view (a range the user sees through the eye) together.

As such, the image output through the display portion 105 may appear to overlap the general field of view. The electronic device 100 may provide augmented reality (AR) that displays a single image by superimposing a virtual image on a real image or a background using such characteristics of the display.

An image capturing unit 106 is disposed adjacent to at least one of the left eye and the right eye and captures an image of a front side. Since the image capturing unit 106 is positioned adjacent to the eye, the image capturing unit 106 may obtain a scene viewed by the user as an image.

In this drawing, the image capturing unit 106 is illustrated to be included in the control module 103 but is not necessarily limited thereto. The image capturing unit 106 may be installed in the frame part 101 or may be provided in plurality to obtain a stereoscopic image.

The glass type electronic device 100 may include a user input unit 107 operated to receive a control command. The user input unit 107 may employ various schemes including a scheme in which the user operates the user input unit 107 in a tactile manner such as a touch or a push, a gesture scheme of recognizing a movement of the user's hand without directly touching, or a scheme of recognizing a voice command. In the drawing, the user input unit 107 based on the push and touch input scheme is provided in the frame part or the control module 480.

Further, the glass-type electronic device 100 may include a microphone for receiving sound and processing it as electrical voice data and an audio output unit 104 for outputting sound. The audio output unit 104 may be configured to transfer sound according to a general sound output method or a bone conduction method. If the audio output unit 104 is implemented in the bone conduction manner, when the user wears the electronic device 100, the audio output unit 104 is in close contact with the head and vibrates a skull to transmit sound.

Figure 3:
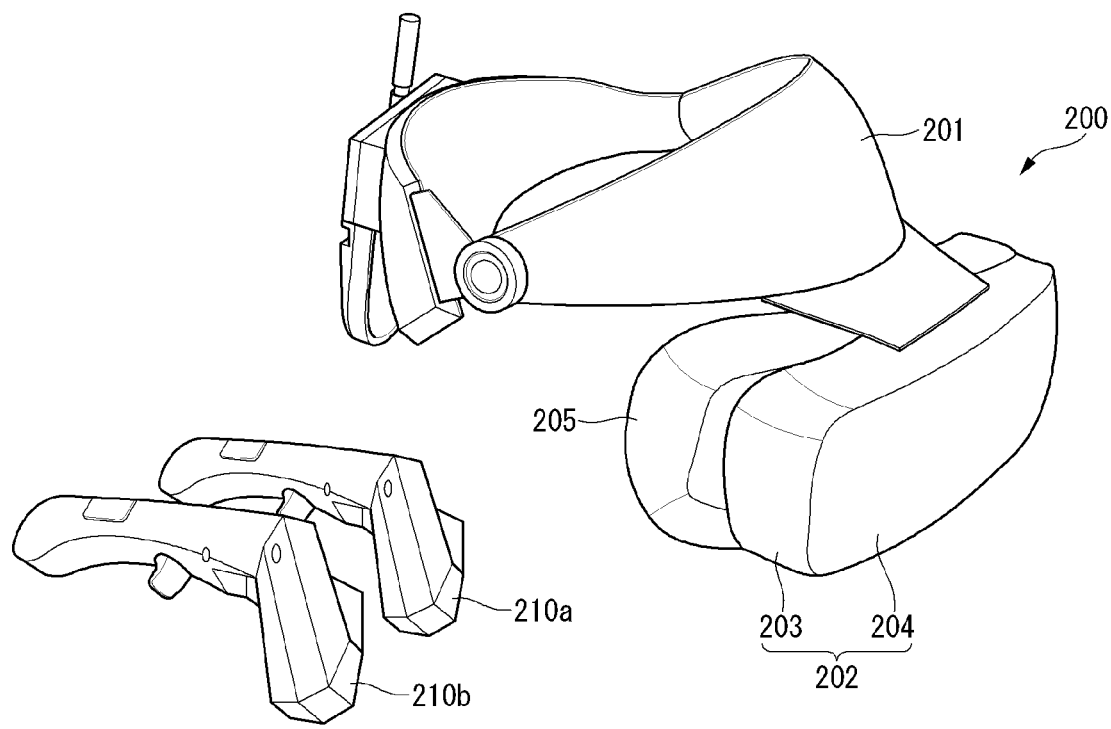
FIG. 3 is a perspective view of a virtual reality (VR) electronic device according to another embodiment of the present invention.
Figure 4:
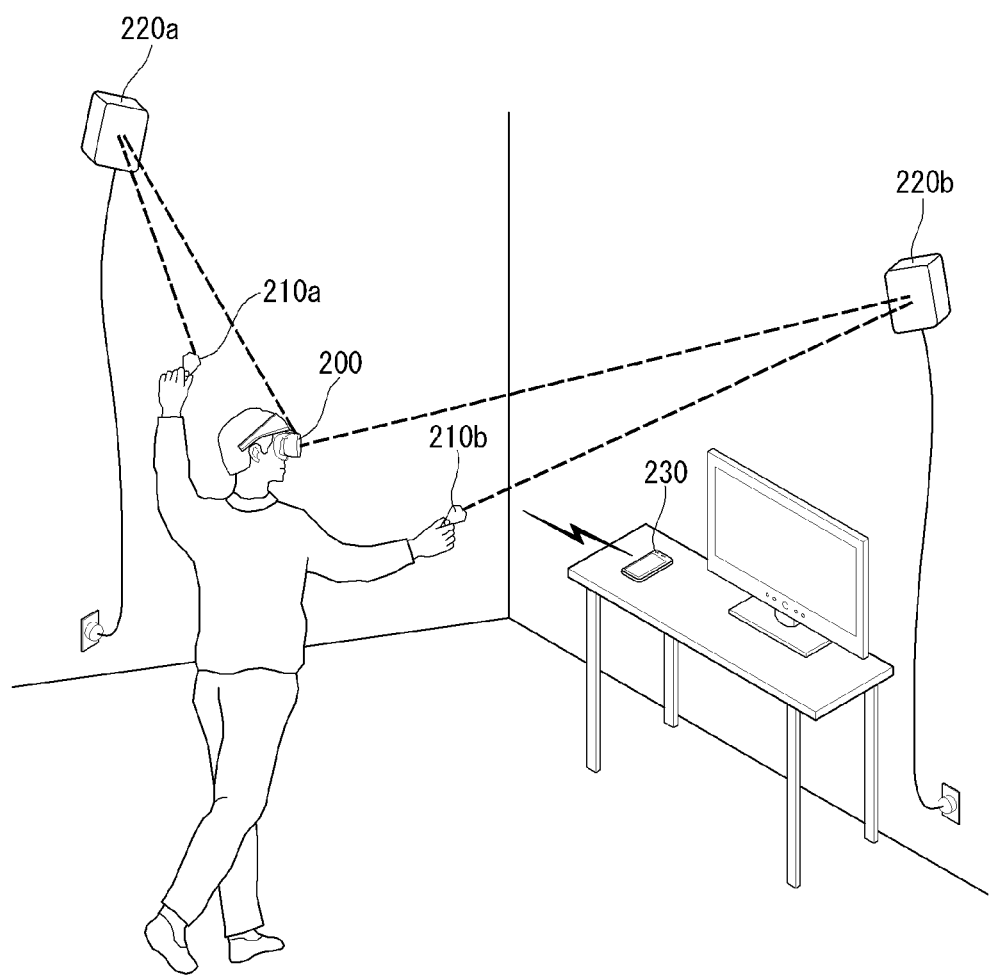
FIG. 4 is a diagram illustrating a state in which the VR electronic device of FIG. 3 is used.

FIG. 3 is a perspective view of a virtual reality (VR) electronic device according to another embodiment of the present invention, and FIG. 4 illustrates a state of using the VR electronic device of FIG. 3.

Referring to FIG. 3, the VR electronic device may include a box-type electronic device 200 mounted on the user's head and a controller 210 (210a, 210b) that the user may grip and operate.

The box type electronic device 200 includes a head unit 201 worn and supported on the head of a human body and a display unit coupled to the head unit 201 to display a virtual image or an image in front of a user's eyes (202). Although the head unit 201 and the display unit 202 are illustrated as being configured as separate units and coupled to each other, the display unit 202 may alternatively be integrally formed with the head unit 201.

The head unit 201 may adopt a structure that surrounds the user's head so as to disperse the weight of the display unit 202 having a sense of weight. Also, a variable length band and the like may be provided to match a head size of different users.

The display unit 202 constitutes a cover portion 203 coupled to the head portion 201 and a display portion 204 accommodating the display panel therein.

The cover portion 203 may also be called a goggle frame and may have a tub shape as a whole. The cover portion 203 has a space formed therein and an opening corresponding to a position of the eyeball of the user on a front surface thereof.

The display portion 204 is mounted on a front frame of the cover portion 203 and is provided at a position corresponding to both eyes of the user to output screen information (image, etc.). The screen information output from the display portion 204 includes not only VR content but also an external image collected through an image capturing unit such as a camera.

The VR content output on the display portion 204 may be VR content stored in the electronic device 100 itself or stored in the external device 230. For example, when the screen information is a virtual space image stored in the electronic device 100, the electronic device 100 performs image processing and rendering processing to process the image of the virtual space and output image information generated as a result of the image processing and rendering processing through the display portion 204. Meanwhile, in the case of the VR image stored in the external device 230, the external device 230 may perform image processing and rendering processing thereon and transmit resultantly generated image information to the electronic device 100. Then, the electronic device 100 may output the 3D image information received from the external device 230 through the display portion 204.

The display portion 204 may include a display panel provided in front of the opening of the cover portion 203, and the display panel may be an LCD or an OLED panel. Alternatively, the display portion 204 may be a display portion of a smartphone. That is, a structure to which a smartphone is detachably attached may be provided on a front side of the cover portion 203.

In addition, an image capturing unit and various sensors may be installed in front of the display unit 202.

The image capturing unit (e.g., the camera) may capture (receives or inputs) an image of the front side, and in particular, may obtain a scene viewed by the user as an image. One image capturing unit may be provided at a central position of the display portion 204 or two or more image capturing units may be provided at positions symmetric to each other. In the case of having a plurality of image capturing units, a stereoscopic image may be obtained. An image obtained by coupling the virtual image to the external image obtained from the image capturing unit may be displayed through the display portion 204.

The sensors may include a gyroscope sensor, a motion sensor or an IR sensor. This will be described in detail later.

A facial pad 205 may be installed at the rear of the display unit 202. The facial pad 205 is adhered to the periphery of the user's eyeball and is formed of a material with cushioning sensation to provide a comfortable wear sensation to the user's face. Further, the facial pad 205 may be formed of a flexible material having a shape corresponding to the front contour of the face of a person and may be in close contact with the face of different users' faces, thereby preventing intrusion of external light to the eyes.

In addition, the box-type electronic device 200 may be provided with a user input unit operated to receive a control command, an audio output unit, and a controller. Since a description thereof is the same as those described above, it will be omitted.

In addition, the VR electronic device may include a controller 210 (210a, 210b) as a peripheral device for controlling an operation related to a virtual space image displayed through the box type electronic device 200.

The controller 210 is provided in a form that a user may easily grip on both hands, and an outer surface thereof may include a touch pad (or track pad), a button, and the like for receiving a user input.

The controller 210 may be used to control a screen output on the display portion 204 interworking with the electronic device 200. The controller 210 may include a grip portion gripped by the user and a head portion extending from the grip portion and having various sensors and a microprocessor embedded therein. The grip portion may be formed in a long vertical bar shape so that the user may easily grip it, and the head portion may be formed in a ring shape.

In addition, the controller 210 may include an IR sensor, a motion tracking sensor, a microprocessor, and an input unit. For example, the IR sensor receives light emitted from the position tracking device 220 (to be described later) and is used to track a user motion. The motion tracking sensor may include a three-axis acceleration sensor, a three-axis gyroscope, and a digital motion processor as one aggregate.

In addition, the grip portion of the controller 200 may include a user input unit. The user input unit may include, for example, keys disposed inside the grip portion, a touch pad (track pad), a trigger button, and the like provided outside the grip portion.

Meanwhile, the controller 200 may perform feedback corresponding to a signal received from the controller 170 of the electronic device 100. For example, the controller 200 may transmit a feedback signal to a user through vibration, sound, or light.

In addition, the user may approach an external environment image checked through a camera provided in the electronic device 200 by operating the controller 210. That is, the user may immediately check the external environment through the operation of the controller 210 without removing the electronic device 200 even during a virtual space experience.

In addition, the VR electronic device may further include a position tracking device 220. The position tracking device 220 detects a position of the box-type electronic device 200 or the controller 210 by applying a positional tracking technique called a lighthouse system, and helps track a 360-degree motion of the user using the detected position.

Referring to FIG. 4, the position tracking system may be implemented by installing one or more position tracking device 220 (220a, 220b) in a closed specific space. The plurality of position tracking devices 220 may be installed at positions where a recognizable space range is maximized, for example, at positions facing each other in a diagonal direction.

The electronic device 200 or the controller 210 may receive light emitted from the LEDs or the laser emitters included in the plurality of position tracking devices 220 and accurately determine a location of the user in the closed specific space on the basis of a correlation between a position to which the corresponding light is received and a time. To this end, each of the position tracking devices 220 may include an IR lamp and a two-axis motor, through which the location tracking devices 220 exchange signals with the box-type electronic device 200 or the controller 210.

In addition, the box-type electronic device 200 may perform wired/wireless communication with the external device. The box type electronic device 200 may receive a virtual space image stored in the connected external device 230 (e.g., a PC, a smartphone, or a tablet, etc.) and display the virtual space image for the user.

Meanwhile, the controller 210 and the position tracking device 220 described above are not essential components and may be omitted in the embodiment of the present invention. For example, an input device installed in the box-type electronic device 200 may replace the controller 220 and may determine location information by itself from sensors installed in the box-type electronic device 200.

Figure 5:
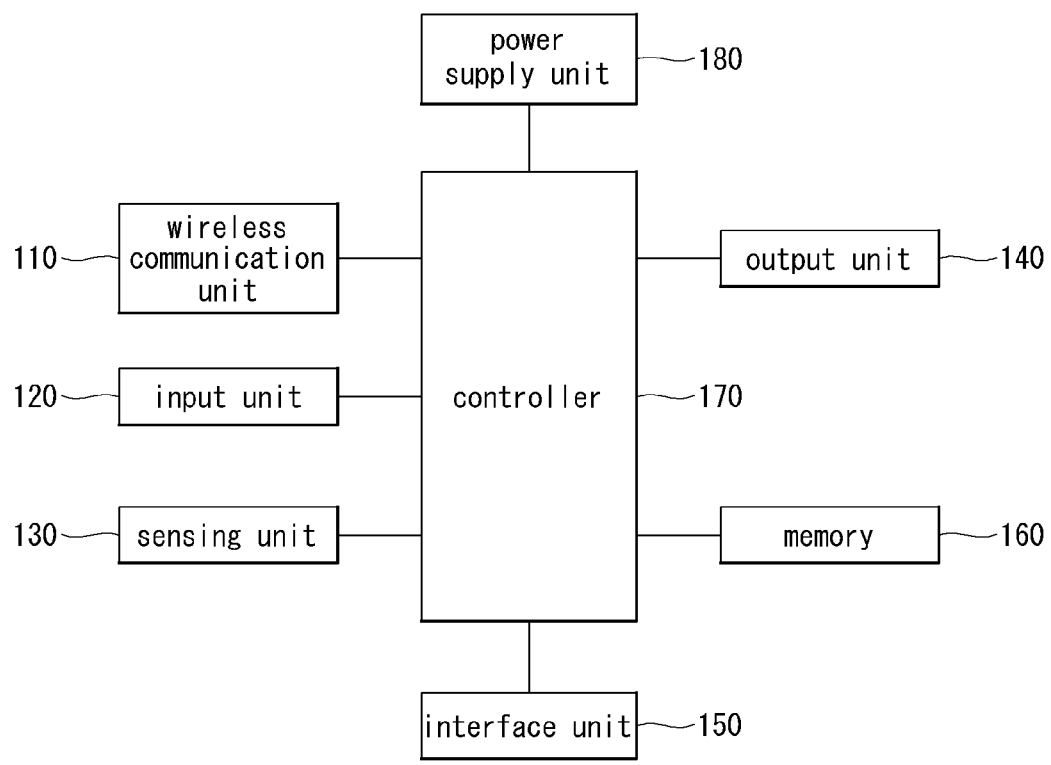
FIG. 5 is a block diagram illustrating a configuration of an extended reality electronic device according to an embodiment of the present invention.

FIG. 5 is a block diagram illustrating a configuration of an extended reality electronic device according to an embodiment of the present invention.

Referring to FIG. 5, the extended reality electronic device 100 may include a wireless communication unit 110, an input unit 120, a sensing unit 130, an output unit 140, an interface unit 150, a memory 160, a controller 170, a power supply unit 180, and the like. The components illustrated in FIG. 5 are not essential to implement an electronic device, and the electronic device described herein may have greater or fewer components than those listed above.

More specifically, among the components, the wireless communication unit 110 may include one or more modules enabling wireless communication between the electronic device 100 and a wireless communication system, between the electronic device 100 and another electronic device, or between the electronic device 100 and an external server. In addition, the wireless communication unit 110 may include one or more modules connecting the electronic device 100 to one or more networks.

The wireless communication unit 110 may include at least one of a broadcast receiving module, a mobile communication module, a wireless internet module, a short-range communication module, and a location information module.

The input unit 120 may include a camera or image input unit for inputting an image signal, a microphone or an audio input unit for inputting an audio signal, and a user input unit (e.g., a touch key, a mechanical key, etc.) for receiving information from the user. Voice data or image data collected by the input unit 120 may be analyzed and processed as a control command of the user.

The sensing unit 130 may include one or more sensors configured to sense internal information of the electronic device, information of a surrounding environment of the electronic device, and user information. For example, the sensing unit 130 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (e.g., image capturing unit), a microphone, a battery gauge, an environment sensor (e.g., a barometer, a hygrometer, a thermometer, a radiation detection sensor, a thermal sensor, and a gas sensor, etc.), and a chemical sensor (e.g., an electronic nose, a health care sensor, a biometric sensor, etc.). The electronic device may utilize a combination of pieces of information sensed by at least two of the sensors.

For example, the controller 170 may detect a movement of the electronic device 100 or the user by using a gyroscope sensor, a gravity sensor, a motion sensor, or the like included in the sensing unit 130. In addition, a user's movement may also be detected through sensors provided in the controller 220 that operates in conjunction with the electronic device 100.

As another example, the controller 170 may detect an object that approaches the electronic device 100 or the user by using a proximity sensor, an illumination sensor, a magnetic sensor, an infrared sensor, an ultrasonic sensor, an optical sensor, and the like included in the sensing unit 130.

The output unit 140, which is serves to generate an output related to visual, auditory, or tactile senses, may include at least one of a display unit, an audio output unit, a haptic module, and an optical output unit. The display unit may have an inter-layered structure or integrally formed with a touch sensor to implement a touch screen. The touch screen may function as a user input unit 120 that provides an input interface between the AR electronic device 100 and the user and may provide an output interface between the AR electronic device 100 and the user.

The interface unit 150 serves as an interface with various types of external devices 230 connected to the AR electronic device 100. The electronic device 100 may be provided with VR or AR content from the external device 230 through the interface unit 150 and may interact with each other by exchanging various input signals, sensing signals, and data.

For example, the interface unit 150 include at least one of wired or wireless ports, external charger ports, wired/wireless data ports, memory card ports, ports for connecting a device having an identification module, audio input/output (I/O) ports, video I/O ports, and earphone ports.

In addition, the memory 160 stores data supporting various functions of the AR electronic device 100. The memory 160 may store a plurality of application programs (or applications) driven by the AR electronic device 100, data for operation of the AR electronic device 100, and instructions. At least some of these applications may be downloaded from an external server via wireless communication. In addition, at least some of these applications may be provided in the AR electronic device 100 from a time of release for basic functions of the AR electronic device 100 (e.g., call incoming, call outgoing, message receiving, message sending). The application program may be stored in the memory 160 and installed on the AR electronic device 100 and may be driven by the controller 170 to perform an operation (or function) of the electronic device.

In addition to the operation related to the application program, the controller 170 generally controls an overall operation of the AR electronic device 100. The controller 170 may provide or process information or a function appropriate to the user by processing signals, data, information, and the like, which are input or output through the components described above or by driving an application program stored in the memory 160.

In addition, the controller 170 may control at least some of the components in order to drive an application program stored in the memory 160. In addition, the controller 170 may operate a combination of at least two of the components included in the AR electronic device 100 to drive the application program.

The power supply unit 180 receives external power or internal power under the control of the controller 170 to supply power to each component included in the AR electronic device 100. The power supply unit 180 may include a battery, and the battery may be an internal battery or a replaceable battery.

At least some of the above components may operate in cooperation with each other to implement an operation, control, or control method of the electronic device according to various embodiments described below. In addition, the operation, control, or control method of the electronic device may be implemented on the electronic device by driving at least one application program stored in the memory 160.

Hereinafter, an HMD device 500 and a slide structure according to an embodiment of the present invention will be described with reference to FIGS. 6 to 17.

Figure 6:
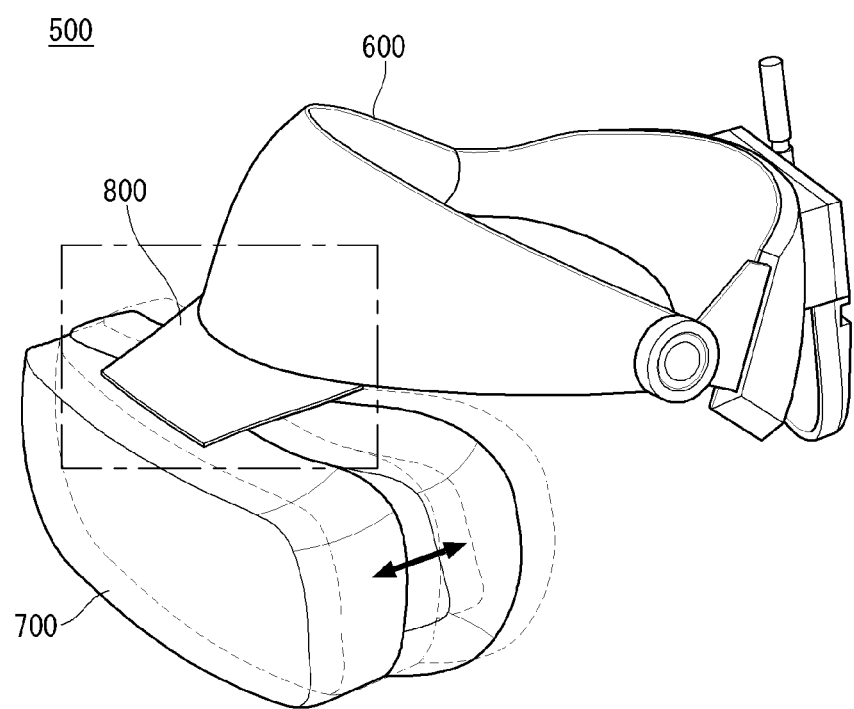
FIG. 6 is a perspective view of an HMD device according to an embodiment of the present invention.
Figure 7:
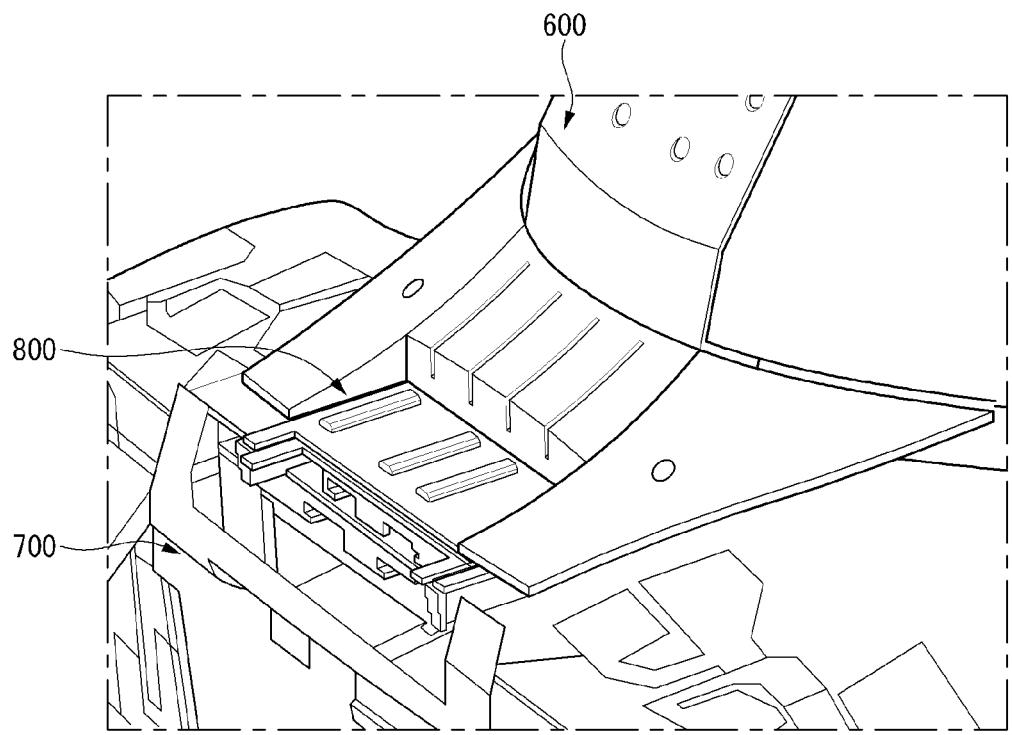
FIG. 7 is an enlarged perspective view of a slide unit in FIG. 6.
Figure 8:
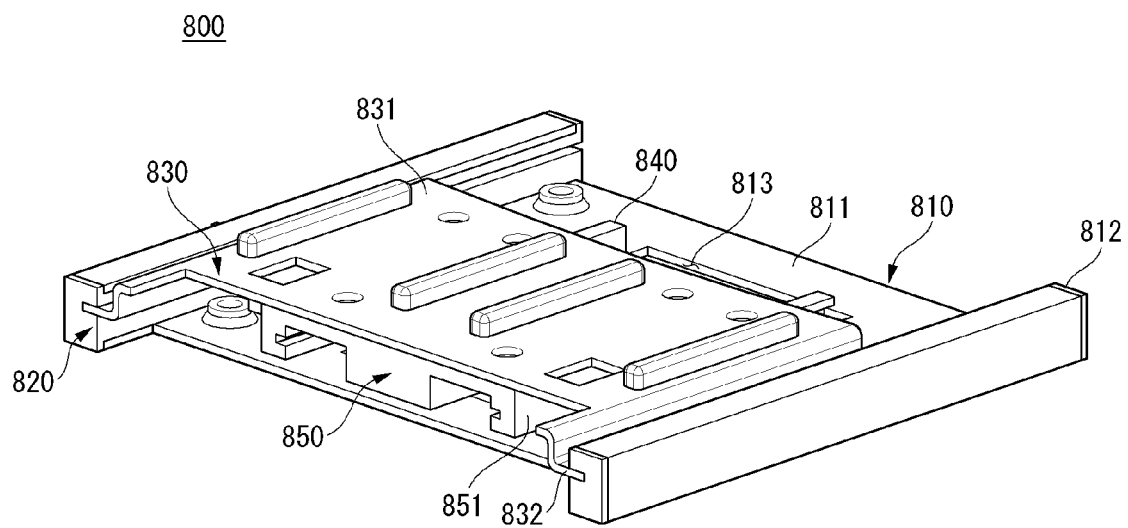
FIG. 8 is a perspective view illustrating a coupling relationship of a slide unit.
Figure 9:
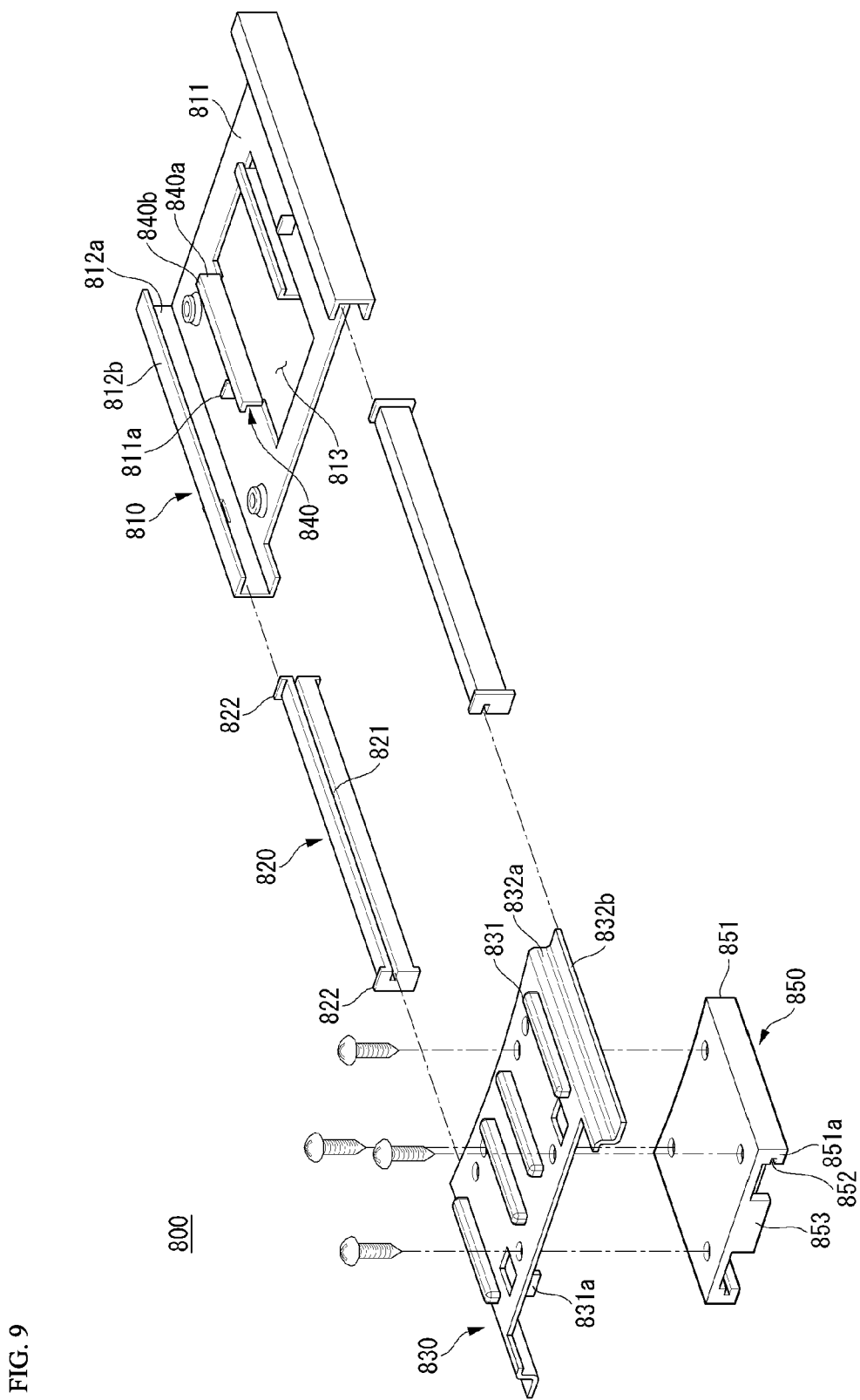
FIG. 9 is an exploded perspective view of FIG. 8.
Figure 10:
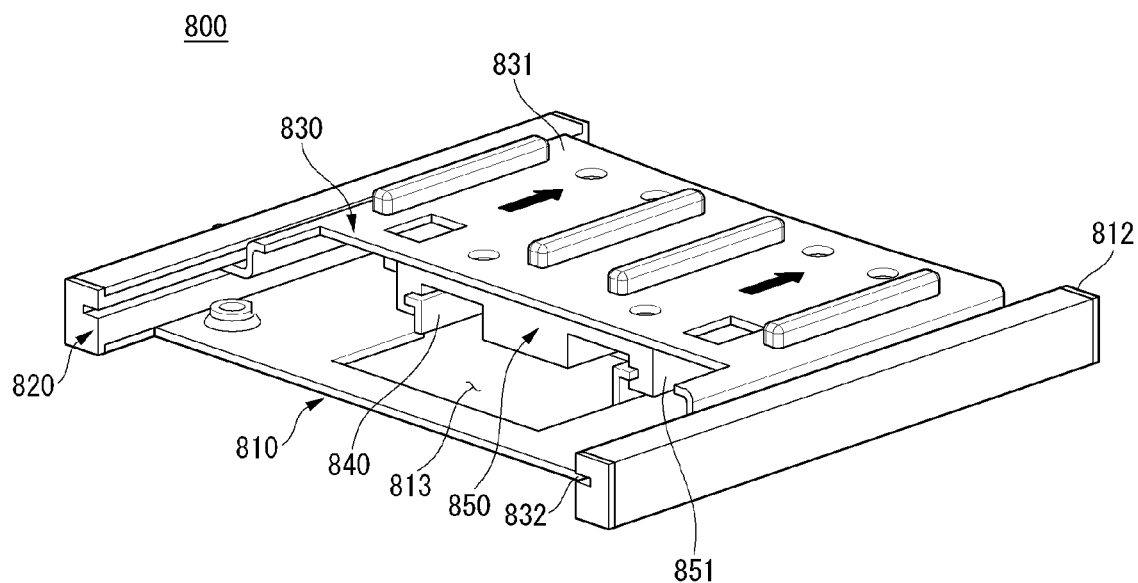
FIG. 10 is a perspective view illustrating a state in which a base is moved forward.

FIG. 6 is a perspective view illustrating an HMD device 500 according to an embodiment of the present invention, FIG. 7 is an enlarged view of a slide unit 800 in FIG. 6, FIG. 8 is a perspective view illustrating a coupling relation of the slide unit 800, and FIG. 9 is an exploded perspective view of FIG. 8. Also, FIG. 10 is a perspective view illustrating a state in which a base 810 is moved forward.

As illustrated, the HMD device 500 includes a support unit 600 supported by a user's head, a display unit 700 displaying an image, and the slide unit 800 coupling the support unit 600 and the display unit 700 to be relatively movable with respect to each other.

The support unit 600, which serves to fix the HMD device 500 to the user's head, may be formed of a flexible material, e.g., a band such as rubber or the like, which may wrap the user's head. Here, the band may be adjusted in length according to a circumference of the user's head when worn on the user's head.

The support unit 600, which serves to fix the display unit 700 to the user's body, may have a band or elastic headband shape that may be worn on the head. Alternatively, the support unit 600 may have a bar or ring shape that may be worn on the ear, such as glasses. In some cases, it may be worn on a face or a neck. In addition, the support unit 600 according to the embodiment of the present invention includes a thing fixed to a part of the user's body.

The display unit 700 may be connected to the support unit 600 through the slide unit 800 and may display an image through a display portion located in front of the user's eyes. In this case, the displayed image may be a virtual reality (VR) image, an augmented reality (AR) image, or a mixed reality (MR) as a combination of the VR image and the AR image.

The display unit 700 may be connected to an image signal transmitter (not shown) wiredly or wirelessly. The image signal transmitter may be coupled to the inside of the display unit 700 or may be provided separately from the HMD device 500.

In addition, the HMD device 500 may further include a motion sensor for tracking a user's motion and a camera for identifying an external environment.

One side of the slide unit 800 may be coupled to the support unit 600 and the other side thereof may be coupled to the display unit 700. The slide unit 800 may be provided to allow the display unit 700 to relatively move with respect to the support unit 600.

With the support unit 600 fixed to the user's head, a distance between the user's eyes and the display portion may be varied by moving the display unit 700 forward and backward. Advantages may be obtained by using a structure that may vary the distance between the eyes and the display portion.

For example, when the user wears glasses, the display unit 700 may need to move forward to secure a space occupied by the glasses. In this case, the user may perform driving by directly pulling the slide unit 800 or turning a dial.

Alternatively, a separate sensor and a controller for determining whether the user wears glasses may be provided. A sensor (not shown) mounted on the support unit 600 or the display unit 700 may determine the presence or absence of glasses, and when it is determined that the user wears glasses on the basis of information recognized by the sensor, the display unit 700 may move forward through a slide driving unit (not shown) which drives the slide unit 800 so that a distance between the display unit 700 and the user's eyes is increased. The slide driving unit may be formed of a combination of a motor and a gear assembly, and a detailed description thereof will be omitted.

Alternatively, instead of a sensor for determining whether the user wears glasses, an input unit (not shown) that receives information on whether the user wears glasses from the user may be provided. The user may input information on whether the user wears glasses through a touch or physical button, and when it is determined that the user wears glasses on the basis of the information from the input unit, the controller may move the display unit 700 forward through the slide driving unit (not shown) driving the slide unit 800 so that a distance between the display unit 700 and the user's eyes is increased.

In addition to the wearing of glasses, an optimal eye relief (ER) (distance between the lens and the eyes) may also be varied according to a difference in vision or face shape of the user. Also, in this case, an ER distance optimized for the user's physical condition may be set by moving the display portion back and forth through the slide unit 800.

For example, the user may adjust an optimal ER distance appropriate for the user's vision, while moving the display portion back and forth by driving the slide unit 800.

Alternatively, the slide unit 800 may be actively driven through the sensor and the controller. An optimal ER distance for each situation may be set by recognizing a position or size of a pupil of the user through a separate sensor provided in the display unit 900. A sensor (not shown) may recognize information about an eyeball of the user (a position or size of the pupil, etc.), the controller may set an optimal ER distance by analyzing the information of the sensor, and the display unit 700 may be moved to a position corresponding to the optimal ER distance, while moving forward/backward.

Hereinafter, the structure and operation of the slide unit 800 will be described in detail.

The slide unit 800 includes a base 810, a slide member 830 moving forward and backward in one direction with respect to the base 810, and a first slide supporter 820 provided between the base 810 and the slide member 830, and an inner guide member 850 provided on one surface of the slide member 830.

The base 810 may be coupled to an upper surface of the display unit 700, and the slide member 830 may be coupled to a lower surface of the support unit 600. Conversely, the base 810 may be coupled to the lower surface of the support unit 600 and the slide member 830 may be coupled to the upper surface of the display unit 700.

Movement of the slide member 830 and the base 810 refers to relative movement with each other, and with respect to the user, the position of the slide member 830 is fixed and the base 810 moves forward and backward toward or away from the user.

The base 810 may include a lower plate 811 and a pair of first outer guide portions 812 bent upward from both sides of the lower plate 811.

The first outer guide portion 812 has a first surface 812a bent upward with respect to the lower plate 811 and a second surface 812b bent inward from an upper portion of the first surface 812a. Therefore, when viewed from the front, the first outer guide portion 812 may have a "⌐" shape.

In addition, the base 810 may be formed by using a method of cutting and bending a single plate member, thereby reducing production cost. For example, the first surface 812a may be formed by bending both side portions of the base 810 upward and the second surface 812b may be formed by bending an upper portion of the first surface 812a inward. An opening 813 may be formed by cutting an inner central portion of the base 810. By forming the opening 813, a weight may be reduced, and a fixing unit for fixing the slide member 830, or a cable, a connector, etc., may pass through the opening 813.

The first outer guide portion 812 may include a first slide supporter 820 to effectively perform a function of guiding the slide member 830.

The first slide supporter 820 may have a block shape extending along a lengthwise direction of the first outer guide portion 812. The first slide supporter 820 may be inserted into a space surrounded by the lower plate 811, the first surface 812a, and the second surface 812b of the first outer guide portion 812.

In addition, the first slide supporter 820 may have a guide slit 821 into which a side end portion of the slide member 830 is inserted. The guide slit 821 may extend in a movement direction of the slide member 830 (a lengthwise direction of the first outer guide portion 812). A front end and a rear end of the first slide supporter 820 may include a flange 22 shape. The first outer supporter 812 is designed to fit between both end portions of the first slide supporter 820 so that the first slide supporter 820 may be firmly fixed to the base 810.

The first slide supporter 820 may be formed of a material having a small coefficient of friction or a surface thereof may be coated to reduce the coefficient of friction.

Meanwhile, in the drawing, it is illustrated that the first outer guide portion 812 and the first slide supporter 820 are separately provided, but alternatively, a guide slit may be provided in the first outer guide portion 812 and the first slide supporter may be unnecessary.

The slide member 830 may include an upper plate 831 and second outer guide portions 832 provided on both sides of the upper plate 831. The second outer guide portion 832 may be formed on both side edges of the slide member 830 and may be provided as a pair guided to the pair of first outer guide portions 812 of the base 810, respectively.

The slide member 830 may be provided in a rectangular plate shape, and the second outer guide portion 832 may be provided on both side edges thereof.

The second outer guide portion 832 may include a first surface 832a bent downward with respect to the upper plate 831 and a second surface 832b bent outward from a lower portion of the first surface 832a. Therefore, when viewed from the front, the second outer guide portion 832 may have a '⌐' shape.

The second surface 832b of the second outer guide portion 832 is inserted into the guide slit 821 of the first slide supporter 820 and is guided along the guide slit 821 to move forward and backward. Here, the movement is relative as described above.

In addition, the slide member 830 may be formed by using a method of cutting and bending a single plate member, thereby reducing a production cost. For example, the first surface 832a may be formed by bending both sides of the slide member 830 downward and the second surface 832b may be formed by bending a lower portion of the first surface 832a outward. A stop member 831a may be formed by cutting a portion of an inner side of the slide member 830 and bending the portion downward. The stop member 831a may be caught by a portion protruding upward from the lower plate 811 of the base 810, thus limiting a movement range of the slide member 830.

Meanwhile, the slide unit 800 may further include a stop unit (not shown) capable of fixing the slide member 830 to a target position in addition to the component for moving the slide member 830. For example, the stop unit may include grooves arranged at a predetermined interval in a front-rear direction on a lower surface of the slide member 830 and a stop protrusion inserted into any one of the grooves through the opening 813 of the base 810. Specifically, when the user operates a button or the like, the stop protrusion may be released from the groove to allow the slide member 830 to move, and when the user releases the button, the stop protrusion may be inserted into the groove at a corresponding position to restrain the slide member 830 from moving. This structure may be easily configured by a person skilled in the art through the technical content described above and a detailed description thereof will be omitted.

Next, the inner guide portions 840 and 851 according to the embodiment of the present invention will be described with reference to FIGS. 11 to 13.

The HMD device 500 according to an embodiment of the present invention is required to be small and light in weight. Accordingly, a width length of the slide unit 800 in a front-rear direction is limited and a length in the front-rear direction of the slide member 830 moving along the base 810 is inevitably shortened. As the length of the slide member 830 in the front-rear direction is shortened, a stroke that the slide member 830 moves may be lengthened. Longer stroke has the advantage that the adjustable ER distance margin is increased.

However, if the length of the slide member 830 in the front-rear direction is shortened to maintain the stroke of a certain distance or greater, while reducing the device, the area in which the second outer guide portion 832 is supported by the first outer guide portion 812 is reduced. That is, the area in which the slide member 830 is supported by the base 810 is reduced, and thus, rigidity of the slide unit 800 is lowered. For this reason, the display unit 700 having a relatively heavy weight may wobble and a load may be concentrated on the outer guide portions 812 and 832 to reduce durability.

In order to solve the above problem, the HMD device 500 according to an embodiment of the present invention further includes inner guide portions 840 and 851 in addition to the outer guide portions 812 and 832.

The base 810 includes a first outer guide portion 812 for guiding movement of the slide member 830 from the outside and a first inner guide portion 840 for guiding movement of the slide member 830 from the inside. Thus, by providing the guide portion having the dual structure, it is possible to reduce the load applied to the guide portion.

Specifically, the first inner guide portion 840 may be provided as a pair bent upward from an inner central portion of the lower plate 811.

The first inner guide portion 840 may include a first surface 840a bent upward with respect to the lower plate 811 and a second surface 840b outward from an upper portion of the first surface 840a. Therefore, when viewed from the front, the first inner guide portion 840 may have ' ┐ ' shape.

In addition, the base 810 may be formed by using a method of cutting and bending a single plate member, thus reducing a production cost. For example, the first surface 840a may be formed by cutting the inner side of the base 810 in the front-rear direction and bending the cut both side portions upward, and the second surface 840b may be formed by bending an upper portion of the first surface 840a outward. Also, an opening 813 may be formed at a central portion of the base 810. By forming the opening 813, a weight may be reduced, and a fixing unit for fixing the slide member 830, or a cable, a connector, or the like may pass through the opening 813.

A stop member 811a may be formed by cutting a portion of the inner side of the base 810 and bending the portion upward. The stop member 811a may be caught by a portion protruding downward from the upper plate 831 of the slide member 830 to limit a movement range of the slide member 830.

The slide member 830 may include a second outer guide portion 832 guided and moved by the first outer guide portion 812 of the base 810 from the outside and a second inner guide portion 851 guided and moved by the first inner guide portion 840 of the base 810 from the inner side. The second inner guide portion 851 may be provided as a pair guided by the pair of first inner guide portions 840 of the base 810, respectively.

Figure 11:
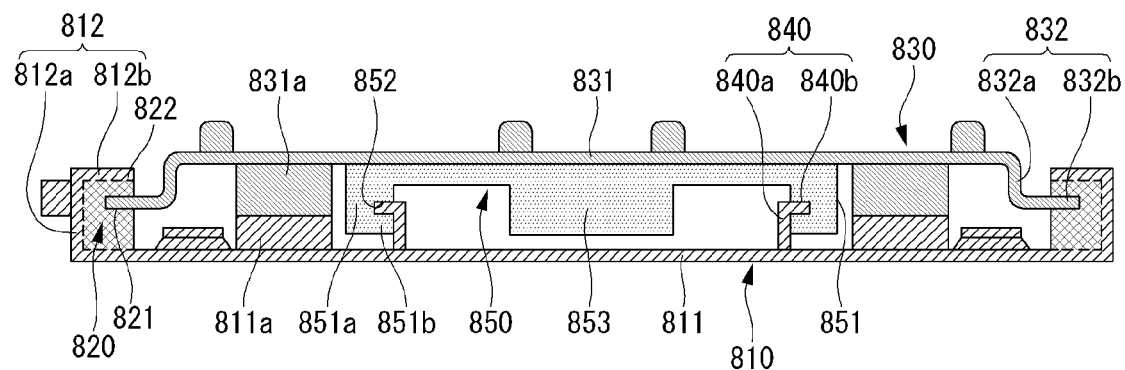
FIG. 11 is a front view showing an inner guide portion according to a first embodiment.

FIG. 11 is a front view illustrating an inner guide portion according to a first embodiment.

Referring to FIG. 11, an inner guide member 850 may be provided separately from the slide member 830 to form a second inner guide portion 851.

The inner guide member 850 may be coupled to a lower surface of the upper plate 831 of the slide member 830. The inner guide member 850 and the slide member 830 may be coupled using various coupling methods in addition to bolt or pin coupling. In addition, the inner guide member 850 may be formed of a material having a small coefficient of friction or a surface thereof may be coated to reduce the coefficient of friction.

A pair of second inner guide portions 851 may be provided on both side portions of the inner guide member 850. The second inner guide portion 851 is provided to extend in a movement direction of the slide member 830.

The second inner guide portion 851 may include a first surface 851a bent downward with respect to the inner guide member 850 and a second surface 851b bent inward from a lower portion of the first surface 851. Therefore, when viewed from the front, the second inner guide portion 851 may have a " ∟ " shape.

The second inner guide portion 851 may be surrounded by the upper surface, the first surface 851a, and the second surface 851b and may have a guide slit 852 extending in a front-rear direction of the inner guide member 850.

The second surface 840b of the first inner guide portion 840 is inserted into the guide slit 852 of the second inner guide portion 851 and is guided along the guide slit 841 to move forward and backward. Here, the movement is relative as described above.

The stop member 853 may be formed by cutting a portion of the inner side of the inner guide member 850 and bending the portion downward. The stop member 853 may be caught by a portion protruding upward from the lower plate 811 of the base 810 to limit a movement range of the inner guide member 850.

Figure 12:
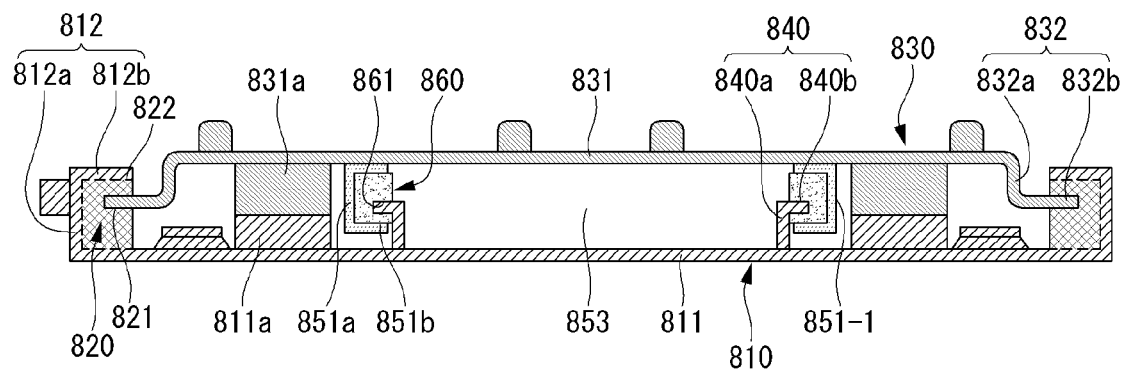
FIG. 12 is a front view showing an inner guide portion according to a second embodiment.

FIG. 12 is a front view showing an inner guide portion according to a second embodiment.

Referring to FIG. 12, the inner guide member (see 850 of FIG. 11) may be integrally formed with the slide member 830. That is, a second inner guide portion 851-1 may be formed to extend from the upper plate 831. The second inner guide portion 851-1 extends in a movement direction of the slide member 830.

For example, the first surface 851a of the second inner guide portion 851-1 may be formed by cutting the inner side of the slide member 830 in a front-rear direction and bending cut both side portions downward, and the second surface 851b may be formed by bending a lower portion of the first surface 851a. Also, an opening may be formed at a central portion of the slide member 830.

The second inner guide portion 851-1 may include a second slide supporter 860 to effectively perform the function of guiding the first inner guide portion 840.

The second slide supporter 860 may have a block shape extending along a lengthwise direction of the second inner guide portion 851-1. A second slide supporter 860 may be inserted into a space surrounded by the upper plate 831, the first surface 851a, and the second surface 851b of the slide member 830.

In addition, the second slide supporter 860 may have a guide slit 861 guiding the first inner guide portion 840 therein. The guide slit 861 may extend in a lengthwise direction of the slide member 830. In addition, a front end portion and a rear end portion of the second slide supporter 860 may include a flange shape (not shown). The second inner support part 851-1 is designed to fit between both end portions of the second slide supporter 860 so that the second slide supporter 860 may be fixed to the second inner guide portion 851-1.

The second surface 840b of the first inner guide portion 840 is inserted into the guide slit 861 of the second slide supporter 860 and is guided along the guide slit 861 to move forward and backward. Here, the movement is relative as described above.

In addition, the second slide supporter 860 may be formed of a material having a small coefficient of friction or a surface thereof may be coated to reduce the coefficient of friction.

Figure 13:
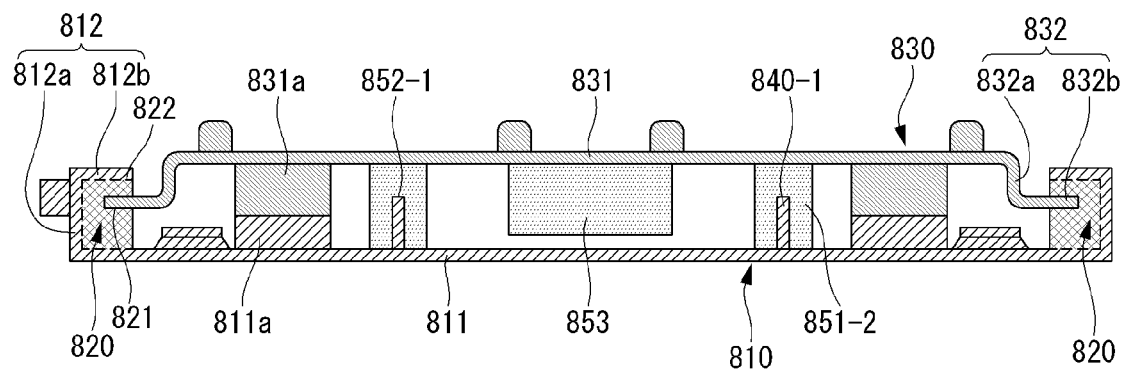
FIG. 13 is a front view illustrating an inner guide portion according to a third embodiment.

FIG. 13 is a front view showing an inner guide portion according to a third embodiment.

Referring to FIG. 13, a first inner guide portion 840-1 may be provided as a pair bent upward from an inner central portion of the lower plate 811.

The first inner guide portion 840-1 may be bent upward with respect to the lower plate 811 and include a protrusion extending in a movement direction. Therefore, when viewed from the front, the first inner guide portion 840-1 may have a '⌉' shape.

In addition, the base 810 may be formed by using a method of cutting and bending a single plate member, thereby reducing a production cost. For example, the first inner guide portion 840-1 may be formed by cutting the inner side of the base 810 and bending the cut both side portions upward. Also, an opening 813 may be formed at a central portion of the base 810. By forming the opening 813, a weight may be reduced, and a fixing unit for fixing the slide member 830, or a cable, a connector, etc., may pass therethrough.

A stop member 811a may be formed by cutting a portion of the inner side of the base 810 and bending the portion upward. The stop member 811a may be caught by a portion protruding downward from the upper plate 831 of the slide member 830, thereby limiting a movement range of the slide member 830.

The second inner guide portion 851-2 may be provided on a lower surface of the upper plate 831. The second inner guide portion 851-2 may be provided separately from the slide member 830 may be combined, or may be integrally provided.

In addition, the second inner guide portions 851-2 may be provided as a pair at positions opposite to a central axis in the movement direction. The second inner guide portion 851-2 extends in a movement direction of the slide member 830.

In addition, a guide slit 852-1 extending in the front-rear direction may be formed on a lower surface of the second inner guide portion 851-2.

The first inner guide portion 840-1 is inserted into the guide slit 852-1 of the second inner guide portion 851-2 and guided along the guide slit 852-1 and moved in the front-rear direction. Here, the movement is relative as described above.

In addition, the stop member 853 may be formed by cutting a portion of the inner side of the inner guide member 850 and bending the portion downward. The stop member 853 may be caught by a portion protruding upward from the lower plate 811 of the base 810, thereby limit a movement range of the inner guide member 850.

Hereinafter, modifications of an outer guide according to an embodiment of the present invention will be described with reference to FIGS. 14 to 17.

In the foregoing, it is described that a technology capable of improving a support area of a guide portion, while shortening a length of the slide member 830 in the front-rear direction. In FIGS. 11 to 13, a technique of achieving the object by adding the inner guide portions 840 and 851 has been described. Hereinafter, in FIGS. 14 to 17, the object is achieved by changing a shape of the outer guide portions 812 and 832. The technique will be described.

Figure 14:
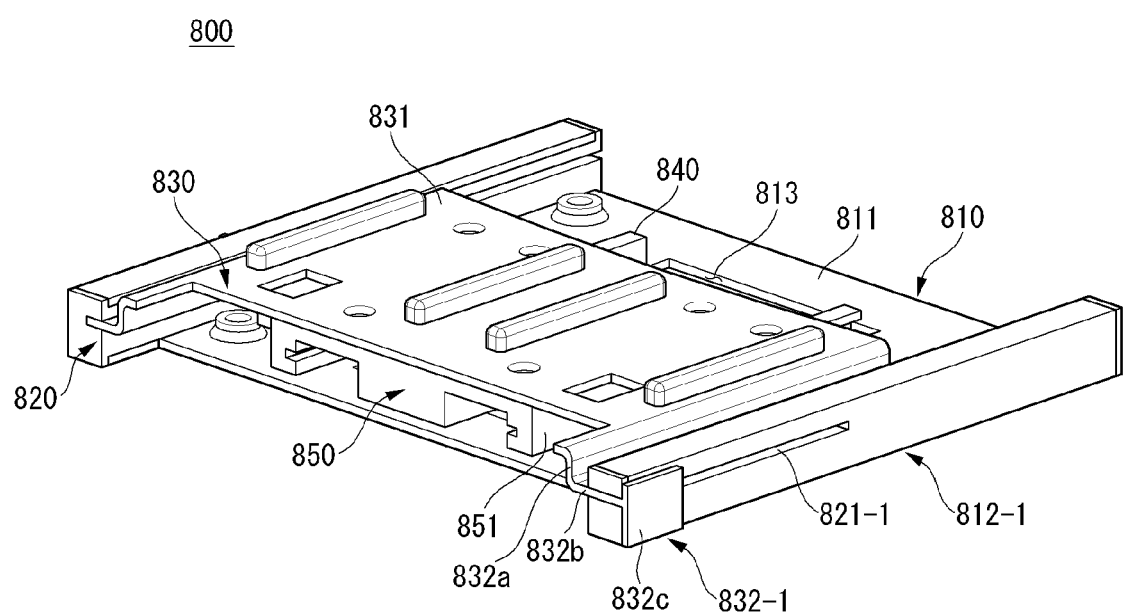
FIG. 14 is a perspective view showing an outer guide portion according to the first embodiment.
Figure 15:
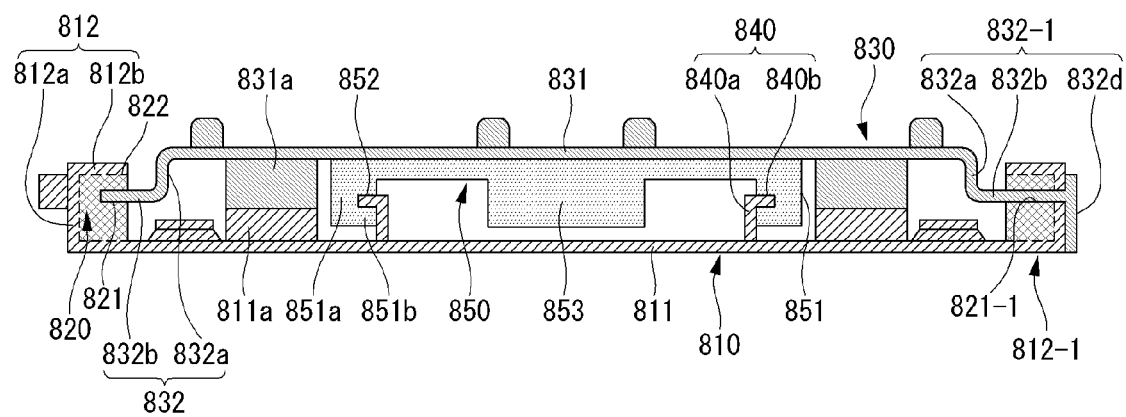
FIG. 15 is a front view of FIG. 14.

Referring to FIGS. 14 and 15, as for the outer guide portions 812-1 and 832-1 according to an embodiment of the present invention, at least one of the first outer guide portions 812-1 respectively provided on both sides may form a third surface 832c as the second surface 832b of the second outer guide portion 832-1 penetrates through the first outer guide portion 812-1 and subsequently extends to support a side surface of the first outer guide portion 812-1.

Specifically, the guide slit 821-1 of the first slide supporter 820 is formed as a through slit penetrating through a side surface of the first slide supporter 820, and a through slit is also formed at a portion corresponding to the guide slit 821-1 on the first surface 812a of the first outer guide portion 812-1 surrounding the slide supporter 820. That is, the second surface 832b extending and protruding laterally from the second outer guide portion 832-1 passes through the slide supporter 820 and the first surface 812a of the first outer guide portion 812-1 and subsequently extends in a vertical direction to form a third surface 832c supporting the first surface 812a of the first outer guide portion 812-1.

The third surface 832c may extend upward or downward and may extend both upward and downward as illustrated in the figure.

In this way, the area in which the first outer guide portion 812-1 and the second outer guide portion 832-1 are in contact with each other is increased, thereby lowering a support load and supporting the display unit 700 more stably and firmly.

Meanwhile, the effect may be further increased by hanging the shape of the outer guide portions 812 and 832 together with the inner guide portions 840 and 851 described above.

Figure 16:
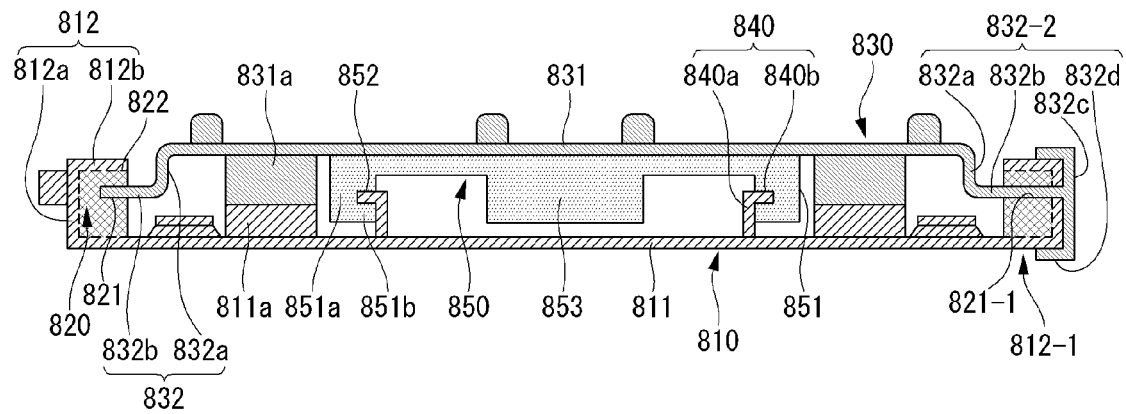
FIG. 16 is a front view illustrating an outer guide portion according to the second embodiment.

Referring to FIG. 16, as for the outer guide portions 812-1 and 832-2 according to another embodiment of the present invention, the second surface 832b of the second outer guide portion 832-1 may penetrate through the first outer guide portion 812-1 and subsequently extends to support a side surface, an upper surface and/or a lower surface of the first outer guide portion 812-1 to form a third surface 832c and a fourth surface 832d.

The second surface 832b extending and protruding laterally from the second outer guide portion 832-1 may penetrate through the slide supporter 820 and the first surface 812a of the first outer guide portion 812-1 and subsequently extends in a vertical direction to form the third surface 832c supporting the first surface 812a of the first outer guide portion 812-1 and extends in a vertical direction from the third surface 832c to form the fourth surface 832d supporting the second surface 812b of the first outer guide portion 812-1.

In addition, the fourth surface 832d may extend along the upper surface of the first outer guide portion 812-1, extending along the lower surface thereof, or extend along both the upper surface and the lower surface as illustrated.

Figure 17:
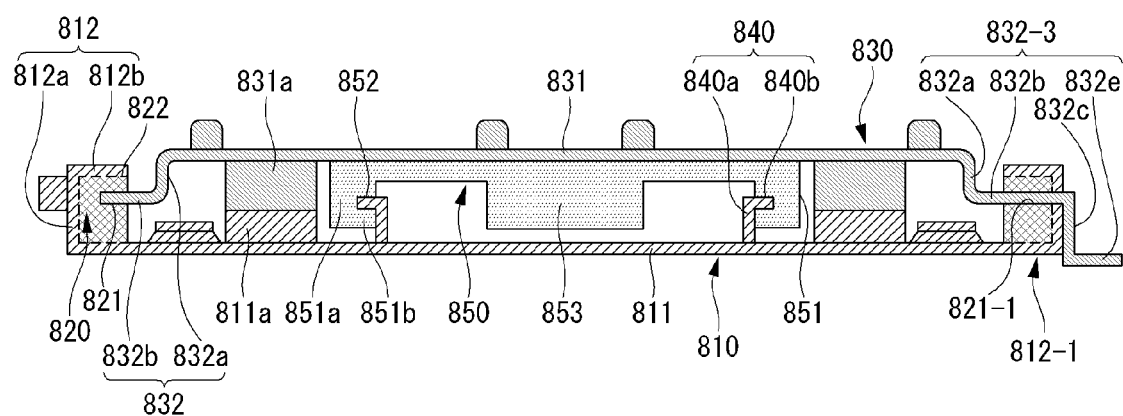
FIG. 17 is a front view illustrating an outer guide portion according to the third embodiment.

Referring to FIG. 17, as for the outer guide portions 812-1 and 832-2 according to another embodiment of the present invention, the second surface 832b of the second outer guide portion 832-1 may penetrate through the first outer guide portion 812-1 and subsequently extends to support the side surface of the first outer guide portion 812-1 to form the third surface 832c and extends to support a horizontal structure of the lower plate 811 of the base 810 or the like to form a fifth surface 832d.

The second surface 832b extending and protruding laterally from the second outer guide portion 832-1 may penetrate through the slide supporter 820 and the first surface 812*a* of the first outer guide portion 812-1 and subsequently extends downward in a vertical direction to form the third surface 832*c* supporting the first surface 812*a* of the first outer guide portion 812-1 and extends outward in a vertical direction from the third surface 832*c* to form a fifth surface 832*e*.

The fifth surface 832*e* may extend in a direction parallel to the base 810 and support the lower plate 811 of the base 810 or another structure parallel thereto.

Particular embodiments or other embodiments of the present invention described above are not mutually exclusive to each other or distinguishable from each other. Individual structures or functions of particular embodiments or other embodiments of the present invention described above may be used in parallel therewith or in combination thereof.

For example, it means that structure A described with reference to a specific embodiment and/or figure and structure B described with reference to other embodiment and/or figure may be combined together. In other words, even if a combination of two different structures is not explicitly indicated, it should be understood that combination thereof is possible unless otherwise stated as impossible.

The detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

In the electronic device according to the present invention, the slide unit having the inner guide portion as well as the outer guide portion is more firmly supported when the display unit is slidably moved to change a distance between the user's eyes and the display portion, thereby minimizing wobbling of the display portion and enhancing durability due to the repeated use.

Further, according to at least one of the embodiments of the present invention, the above effects may be increased by increasing a support area by changing a cross-sectional shape of the guide portion side.

What is claimed is:

1. An electronic device comprising:
a support unit;
a display unit connected to the support unit and displaying an image; and
a slide unit coupling the support unit and the display unit to be relatively movable with respect to each other, wherein the slide unit comprises:
a base coupled to one of the support unit and the display unit; and
a slide member coupled to the other of the support unit and the display unit and moving forward and backward in one direction relatively with respect to the base,
wherein the base comprises a first inner guide portion positioned on an inner side with respect to a first outer guide portion on the basis of the first outer guide portion and a central axis in a movement direction and the slide member comprises a second outer guide portion movably coupled to the first outer guide portion and a second inner guide portion movably coupled to the first inner guide portion.

2. The electronic device of claim 1, wherein
the first outer guide portion and the second outer guide portion are provided by coupling a first guide protrusion and a first slit extending in a movement direction of the first guide protrusion, and
the first inner guide portion and the second inner guide portion are provided by coupling a second guide protrusion and a second slit extending in a movement direction of the second guide protrusion.

3. The electronic device of claim 1, wherein
the slide member includes a slide plate and an inner guide member provided on one surface of the slide plate facing the base,
the second outer guide portion is provided on an outer side of a side portion edge of the slide plate parallel to the movement direction, and
the second inner guide portion is provided on an inner side of the side portion edge of the inner guide member parallel to the movement direction.

4. The electronic device of claim 3, wherein
the inner guide member is coupled to one surface of the slide plate, and
the second inner guide portion protrudes from one surface of the inner guide member facing the base.

5. The electronic device of claim 3, wherein
the inner guide member is integrally formed on the slide plate, and
the second inner guide portion protrudes from one surface of the slide plate facing the base.

6. The electronic device of claim 5, wherein
the second inner guide portion comprises a slide supporter extending in the movement direction and having a slit allowing a portion of the first inner guide portion to be movably inserted therein.

7. The electronic device of claim 3, wherein
the second inner guide portion has a slit extending in the movement direction and opened to face the inner side,
the first inner guide portion includes a guide protrusion protruding toward the outside, and
the guide protrusion is movably coupled to the slit.

8. The electronic device of claim 3, wherein
the inner guide member further comprises a stop member protruding from one surface facing the base, and
the stop member interferes with the protruding portion of the base to limit a movement range of the slide member.

9. The electronic device of claim 1, wherein
the second inner guide portion has a slit extending in the movement direction and opened to face the base,
the first inner guide portion includes a guide protrusion protruding toward the slide member, and
the guide protrusion is movably coupled to the slit.

10. The electronic device of claim 1, wherein
the first outer guide portion is formed by bending one side portion of the base to be parallel to the movement direction, and
the first inner guide portion is formed by bending a peripheral portion of an opening formed inside the base to be parallel to the movement direction.

11. The electronic device of claim 1, wherein
the first outer guide portion and the second outer guide portion are provided by coupling a guide protrusion and a slit extending in the movement direction of the guide protrusion, and
the slit is provided to allow the guide protrusion to penetrate through the first outer guide portion.

12. The electronic device of claim 11, wherein
the guide protrusion has a guide support portion supporting an outer surface of the first outer guide portion at an end portion thereof.

13. The electronic device of claim 12, wherein
the guide support portion comprises a first support surface extending in a direction perpendicular to the movement direction and supporting an outer surface of the first outer guide portion.

14. The electronic device of claim 13, wherein
the guide support portion further comprises a second support surface bent along one surface of the first outer guide portion at an end portion of the first support surface.

15. The electronic device of claim 13, wherein
the first support surface extends toward the base, and
the guide support portion further comprises a third support surface bent in an outward direction parallel to the base at an end portion of the first support surface.

16. The electronic device of claim 1, wherein
the support unit is supported on the head or face part of a user, and
the display unit comprises a display portion positioned in front of the user's eyes and displaying an image and is provided as a head-mounted display (HMD).

17. The electronic device of claim 16, further comprising:
a sensor recognizing information regarding an eyeball of the user or information regarding whether the user wears glasses;
a controller controlling a distance between the display portion and the eyeball through the information from the sensor; and
a slide driving unit operating the slide unit according to a signal from the controller.

18. The electronic device of claim 16, further comprising:
an input unit receiving information regarding whether the user wears glasses from the user; and
a slide driving unit operating the slide unit such that a distance between the display portion and the eyeball is a first distance if the information input to the input unit is information regarding wearing of the glasses and operating the sliding unit such that the distance between the display portion and the eyeball is a second distance shorter than the first distance.

19. An electronic device comprising:
a support unit;
a display unit connected to the support unit and displaying an image; and
a slide unit coupling the support unit and the display unit to be relatively movable with respect to each other,
wherein the slide unit comprises:
a base coupled to one of the support unit and the display unit; and
a slide member coupled to the other of the support unit and the display unit and moving forward and backward in one direction relatively with respect to the base,
wherein the base comprises:
a first outer guide portion extending in a movement direction of the slide member and having a first guide portion provided toward an inner side; and
a first inner guide portion provided on one surface facing the slide member, positioned on an inner side with respect to the first outer guide portion on the basis of a central axis in a movement direction, extending in the movement direction, and having a second guide portion provided toward an outer side, and
the slide member comprises:
a second outer guide portion having a third guide portion movably coupled to the first guide portion and provided toward the outer side; and
a second inner guide portion provided on one surface facing the base, positioned on an inner side with respect to the second outer guide portion on the basis of the central axis in the movement direction, and having a fourth guide portion movably coupled to the second guide portion and provided toward the outer side.

* * * * *